(12) United States Patent
Liang

(10) Patent No.: US 9,095,149 B2
(45) Date of Patent: Aug. 4, 2015

(54) SYSTEM FOR WASHING, DEVEINING AND PEELING SHRIMP

(71) Applicant: Rue Liang, Fresno, CA (US)

(72) Inventor: Rue Liang, Fresno, CA (US)

(*) Notice: Subject to any disclaimer, the term of this patent is extended or adjusted under 35 U.S.C. 154(b) by 83 days.

(21) Appl. No.: 14/092,280

(22) Filed: Nov. 27, 2013

(65) Prior Publication Data

US 2015/0147946 A1    May 28, 2015

(51) Int. Cl.
*A22C 29/02*    (2006.01)

(52) U.S. Cl.
CPC ............ *A22C 29/022* (2013.01); *A22C 29/026* (2013.01)

(58) Field of Classification Search
USPC .................................. 452/2–5, 177, 179, 180
See application file for complete search history.

(56) References Cited

U.S. PATENT DOCUMENTS

| | | | | |
|---|---|---|---|---|
| 2,760,225 | A | * | 8/1956 | Miller ................................ 452/3 |
| 3,576,047 | A | * | 4/1971 | Willis ................................ 452/5 |
| 3,600,744 | A | * | 8/1971 | Muller ............................... 452/4 |
| 3,698,038 | A | * | 10/1972 | Jones, Jr. ........................... 452/3 |
| 4,005,504 | A | * | 2/1977 | Lapeyre ............................ 452/5 |
| 4,121,322 | A | * | 10/1978 | Rutledge .......................... 452/9 |
| 4,393,543 | A | * | 7/1983 | Martin .............................. 452/3 |
| 4,507,825 | A | * | 4/1985 | Betts et al. ....................... 452/2 |
| 4,769,871 | A | * | 9/1988 | Betts ................................. 452/3 |
| 4,996,744 | A | * | 3/1991 | Meyer ............................... 452/3 |
| 5,035,669 | A | * | 7/1991 | Betts ................................. 452/5 |
| 5,522,764 | A | * | 6/1996 | Keith et al. ....................... 452/5 |

* cited by examiner

*Primary Examiner* — Richard Price, Jr.
(74) *Attorney, Agent, or Firm* — Plager Schack LLP

(57) ABSTRACT

A shrimp processing system to wash, peel and devein the shrimp includes a housing, a conveyor system affixed to the housing and having a pathway to receive the shrimp, a motor connected to the conveyor system to transport the shrimp through the pathway, a pair of blades affixed to the housing on opposing sides of the pathway to score the shell proximate the tail portion of the shrimp, a cutter affixed to the housing to slice the shrimp to expose the vein, a high-pressure washing station connected to the housing to direct water at the shrimp to wash out the vein and loosen the shell, and a pair of cylindrical brushes connected to the motor and secured to the housing on opposing sides of the pathway to enable the removal of the shell from the shrimp.

10 Claims, 3 Drawing Sheets

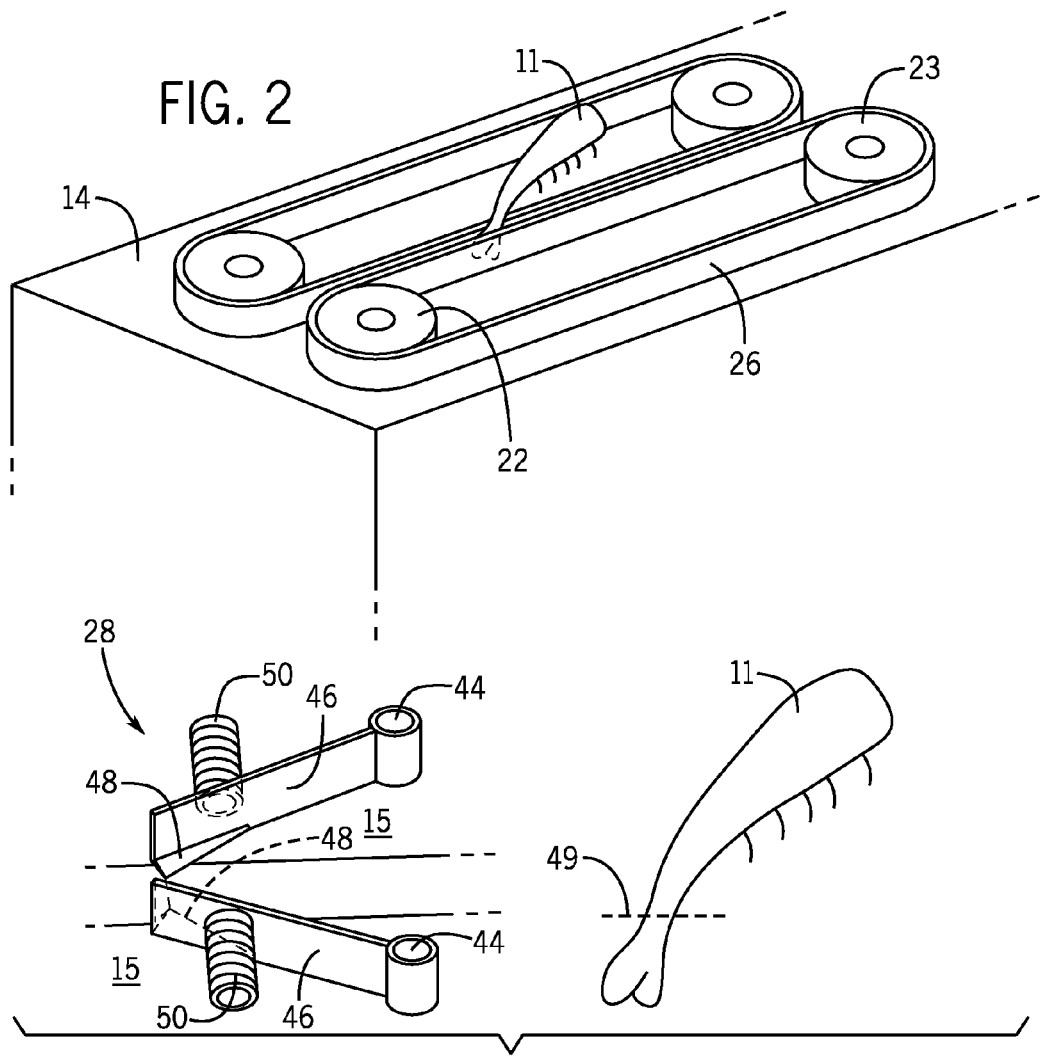
FIG. 2
FIG. 3
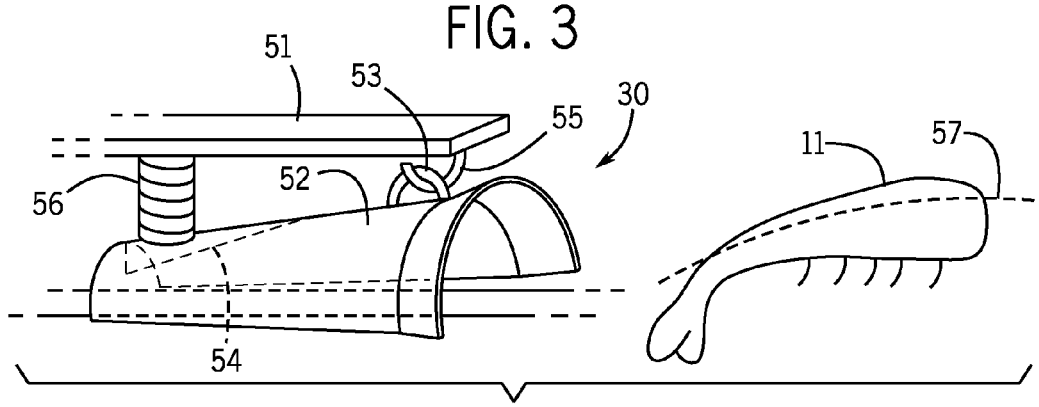
FIG. 4

SYSTEM FOR WASHING, DEVEINING AND PEELING SHRIMP

BACKGROUND

The embodiments herein relate generally to systems for cleaning and peeling shrimp.

Shrimp are popular and widely used in a variety of cuisines. However, many individuals find that it is a burden to clean the shrimp, peel the shell, and/or remove the vein by hand. As such, individuals often seek devices to help them to prepare the shrimp in a more efficient manner. There exists several shrimp peeling devices, such as U.S. Pat. Nos. 5,522,764, and 2,760,225. However, these devices are limited because they are either bulky or difficult to store and/or they comprise many complex moving parts that may be subject to wear and failure. These devices are also limited because they do not adequately wash the shrimp during the shell peeling process.

As such, there is a need in the industry for a shrimp processing system that overcomes the limitations of the prior art. There is a further need in the industry for a compact shrimp processing system that effectively washes, deveins and peels the shrimp.

SUMMARY

A shrimp processing system configured to wash, peel and devein the shrimp is provided. The system comprises a plurality of stations affixed to a housing for processing the shrimp. The system further comprises a conveyor system affixed to the housing and comprising a pathway configured to receive a tail portion of the shrimp, a motor operably connected to the conveyor system to enable the transport of the shrimp through the pathway, a pair of blades mechanically coupled to the housing and secured on opposing sides of the pathway, the pair of blades configured to score the shell proximate the tail portion of the shrimp, a cutter mechanically coupled to the housing and configured to slice an upper portion of the shrimp to expose the vein of the shrimp, a high-pressure washing station operably connected to the housing and configured to direct water at the shrimp to wash out the vein and loosen the shell, and a pair of cylindrical brushes operably connected to the motor and secured to the housing on opposing sides of the pathway, the pair of cylindrical brushes configured to rotate when in contact with the shrimp to enable the removal of the shell from the shrimp.

BRIEF DESCRIPTION OF THE FIGURES

The detailed description of some embodiments of the invention will be made below with reference to the accompanying figures, wherein the figures disclose one or more embodiments of the present invention.

FIG. 2 depicts a perspective view of certain embodiments of the shrimp processing system;

FIG. 3 depicts a perspective view of certain embodiments of the scoring station of the shrimp processing system;

FIG. 4 depicts a perspective view of certain embodiments of the slitting station of the shrimp processing system;

DETAILED DESCRIPTION OF CERTAIN EMBODIMENTS

Figure 1:
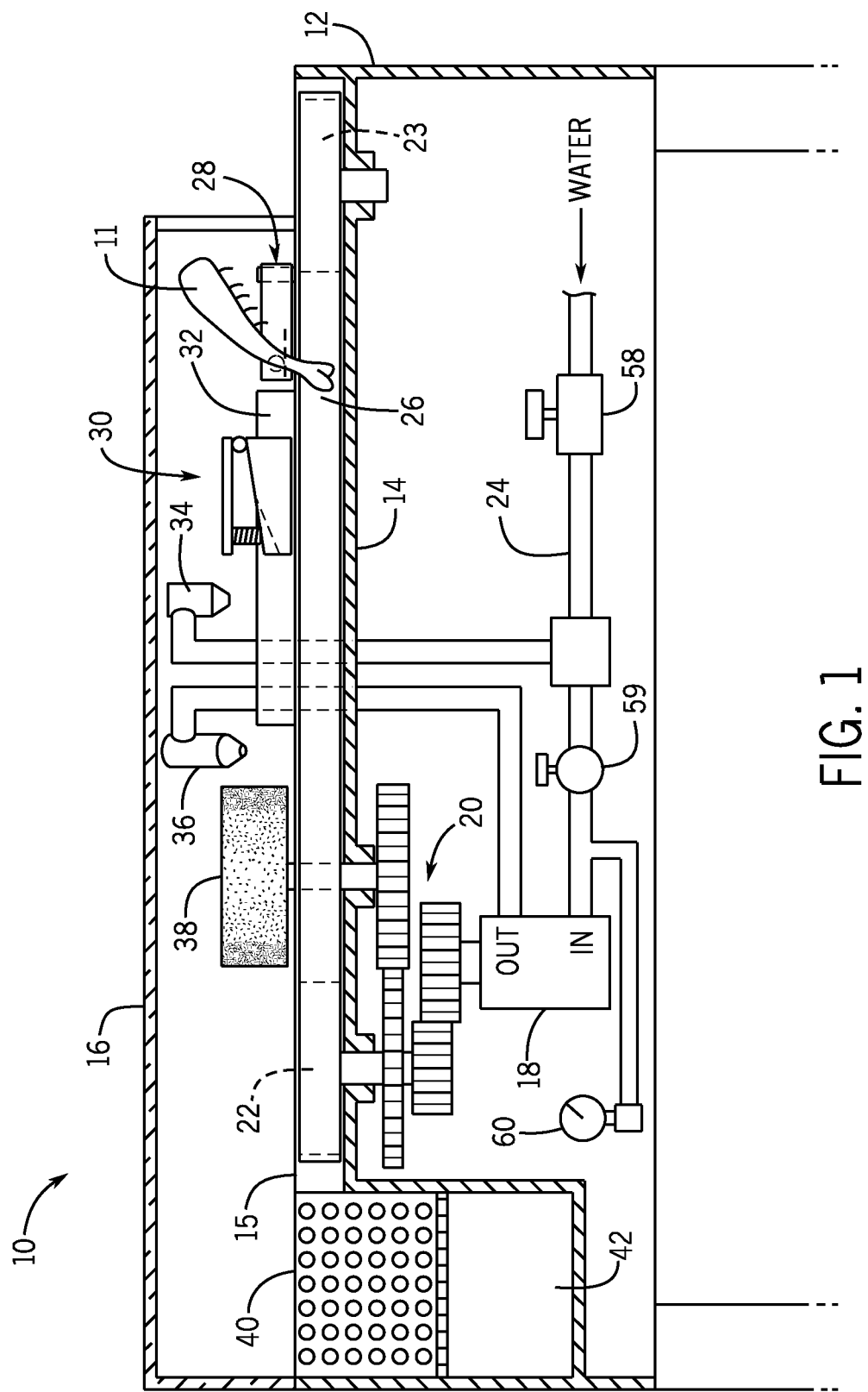
FIG. 1 depicts a longitudinal cross-sectional view of certain embodiments of the shrimp processing system.

As depicted in FIGS. 1 and 2, shrimp processing system 10 processes shrimp 11 and comprises housing 12, drive table 14, housing cover 15, transparent cover 16, hydro-powered motor 18, gear train 20, driving pulley 22, driven pulley 23, water lines 24, belt 26, scoring station 28, slitting station 30, longitudinal guide rails 32, high-pressure water nozzle 34, low-pressure water nozzles 36, cylindrical peelers 38, strainer 40 and sump 42. Shut-off valve 58, pressure control valve 59 and pressure gauge 60 are operably connected to water lines 24. It shall be appreciated that water lines 24 are connected to a water source (not shown) to enable shrimp processing system 10 to function.

Hydro-powered motor 18 may be any type known in the field. Generally, hydro-powered motor 18 will comprise a set of wheels that engage with one another by interlocking teeth. The wheels rotate when water having a sufficient pressure is pumped into the motor via water lines 24. The wheels of hydro-powered motor 18 drive gear train 20, which powers driving pulley 22. As driving pulley 22 rotates, belt 26 engages with pulley 22 and rotates around driving pulley 22 and driven pulley 23. A user can control the water pressure that flows into motor 18 by adjusting pressure control valve 59 until a desired pressure is reached as shown on pressure gauge 60. In the event of an emergency, the user can disable shrimp processing system 10 by adjusting shut-off valve 58, which cuts off the flow of water to hydro-powered motor 18. Cylindrical peelers 38 are operably connected to gear train 20. Therefore, as hydro-powered motor 18 powers gear train 20, cylindrical peelers 38 rotate. Although motor 18 is powered by water, it shall be appreciated that any alternative type of motor may be used in the system.

As depicted in FIG. 2, shrimp processing system 10 comprises a pair of belts 26, driving pulleys 22 and driven pulleys 23 that are operably connected to gear train 20 and hydro-powered motor 18. The space between belts 26 in combination with an opening in housing cover 15 create a pathway for shrimp 11 to be transported through shrimp processing system 10. Each belt 26 has teeth on the outer surface (not shown), such that the teeth of the pair of belts 26 interlock and engage with one another as the system is in operation. As shown in the figures, shrimp 11 is inserted into the pathway with the tail side down. This allows belts 26 to grasp the tail portion of shrimp 11 and hold the shrimp in a vertical position as the shrimp is transported through the system.

As depicted in FIG. 3, scoring station 28 is affixed to housing cover 15 and comprises pivot pins 44, arms 46, blades 48 and springs 50. It shall be appreciated that springs 50 comprise first ends affixed to arms 46 and second ends affixed to supporting structures (not shown) secured to housing cover 15. Blades 48 comprise sharp edges that are directed to the tail portion of shrimp 11. As shrimp 11 is transported through scoring station 28, blades 48 score the shell proximate the tail portion of shrimp 11 along score line 49. During this process, the tail will remain connected to the body of shrimp 11. It shall be appreciated that springs 50 may expand or compress to allow arms 46 and blades 48 to pivot, thereby enabling scoring station 28 to accommodate different sized shrimp. The components of scoring station 28 may comprise any materials known in the field such as steel.

As depicted in FIG. 4, slitting station 30 comprises guide tunnel support 51, guide tunnel 52, pivot 53, pivot 55, cutter 54 and spring 56. Cutter 54 is operably connected to guide tunnel support 51 by spring 56. Guide tunnel support 51 is pivotably mounted to guide tunnel 52 by pivot 53 and pivot 55. As shrimp 11 is transported through guide tunnel 52, cutter 54 makes a 1/8, " deep slice in the upper portion of shrimp 11 along slit line 57. This exposes the gut and/or vein of shrimp 11, which is washed out when shrimp 11 is transported to high-pressure water nozzle 34. Spring 56 may expand or compress to allow cutter 54 to accommodate different sized shrimp. The components of slitting station 30 may comprise any materials known in the field such as steel.

Figure 5:
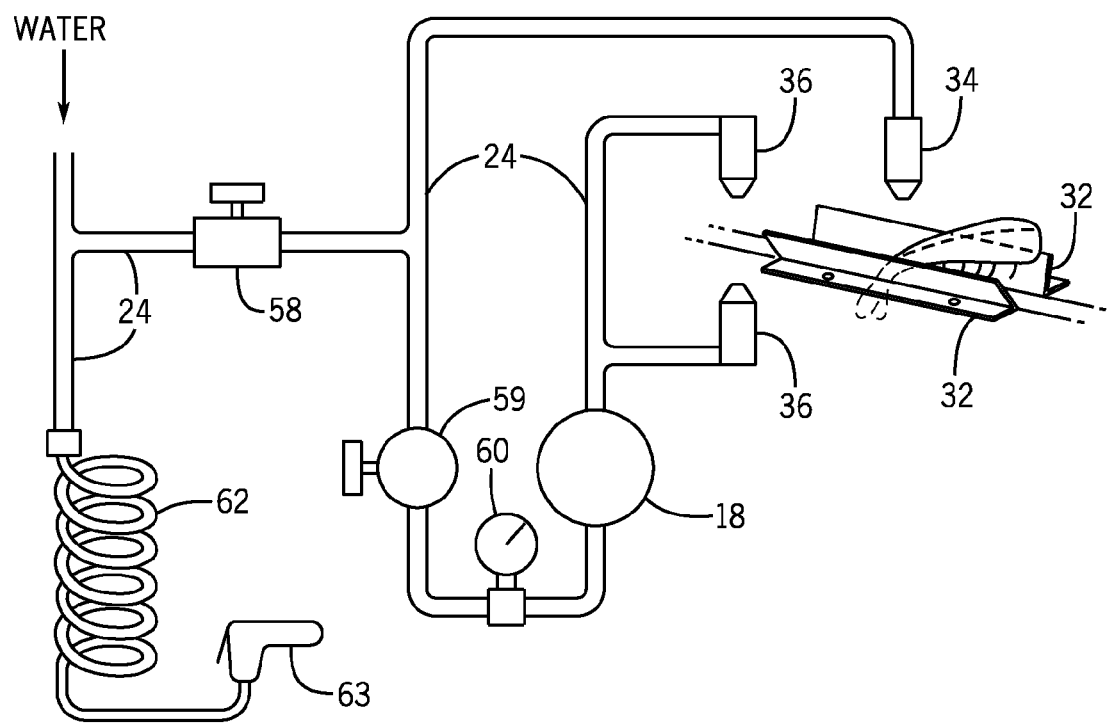
FIG. 5 depicts a schematic view of certain embodiments of the shrimp processing system.

FIG. 5 depicts a schematic view of certain embodiments of shrimp processing system 10. In one embodiment of the invention, shrimp processing system 10 comprises hose 62 operably connected to cleaning gun 63. Hose 62 is connected to the water source (not shown) by water lines 24. The user can use cleaning gun 63 to rinse shrimp processing system 10 and/or shrimp 11.

Figure 6:
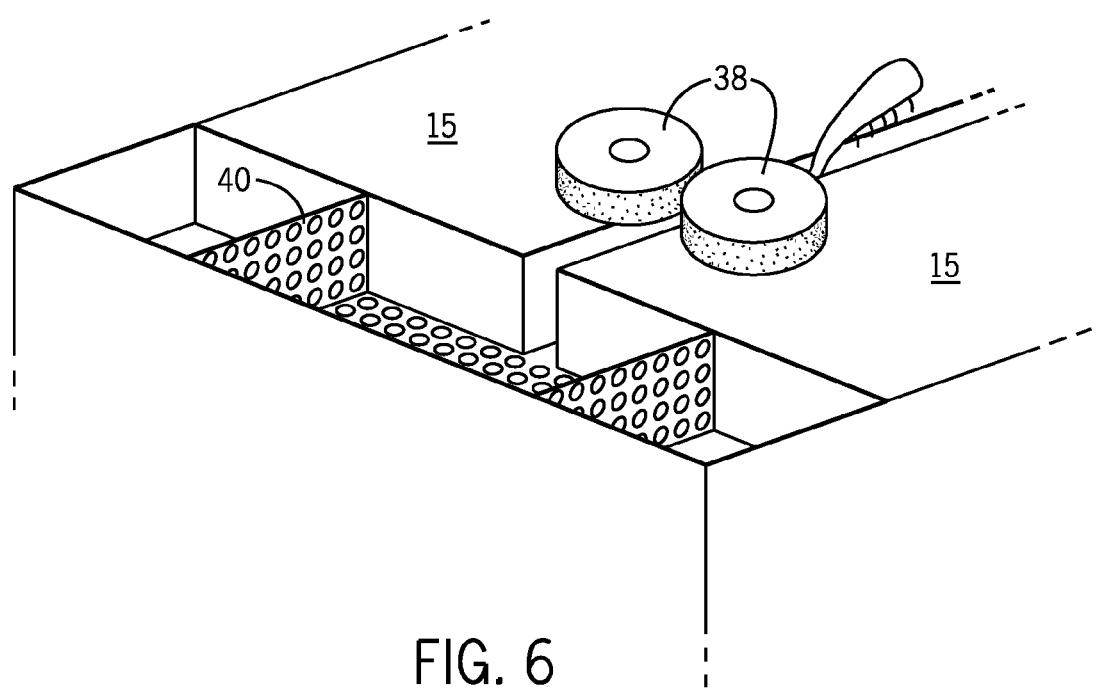
FIG. 6 depicts a perspective view of certain embodiments of the shrimp processing system.

FIG. 6 depicts certain embodiments of shrimp processing system 10. Cylindrical peelers 38 may have an outer layer comprising brushes or an alternative material that can easily remove the shell from shrimp 11. As shrimp 11 is transported through rotating cylindrical peelers 38 via the pathway, the outer layers of peelers 38 contact shrimp 11 and remove the shell from the shrimp. Shrimp 11 is then transported to strainer 40.

To operate shrimp processing system 10, a user adjusts pressure control valve 59 until a desired water pressure is displayed on pressure gauge 60. This enables hydro-powered motor 18 to drive gear train 20, which rotates driving pulleys 22 and cylindrical peelers 38. The user inserts shrimp 11 with the tail portion down in the pathway between rotating belts 26. Belts 26 grab the tail portion of shrimp 11 and transport the shrimp to a plurality of processing stations. As shrimp 11 is transported through scoring station 28, blades 48 score the shell proximate the tail portion of shrimp 11. As shrimp 11 is transported through slitting station 30, cutter 54 makes a 1/8, " deep slice in the upper portion of shrimp 11, thereby exposing the vein and/or guts. Shrimp 11 is then transported to high-pressure water nozzle 34, which washes the guts and/or vein out of the shrimp. The water from water nozzle 34 may also loosen the shell of shrimp 11. Shrimp 11 is then transported through rotating cylindrical peelers 38, which remove the shell of shrimp 11. The clean, deveined and shell-free shrimp 11 is then transported to strainer 40. Low-pressure water nozzles 36 wash the shell and waste of shrimp 11 to sump 42. Transparent cover 16 allows the user to view shrimp 11 as it is processed while protecting the user from water, shells, waste, etc. The user may disable shrimp processing system 10 via pressure control valve 59 or shut-off valve 58. It shall be appreciated that high-pressure water nozzles 34 and low-pressure water nozzles 36 may operate automatically or by a switch controlled by the user. It shall be appreciated that shrimp processing system 10 is capable of processing a high volume of shrimp when in operation.

The components of the system described in several embodiments herein may comprise any known materials in the field and be of any color, size and/or dimensions. This allows the system to accommodate any variety of shrimp. It shall be appreciated that the components of the system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A shrimp processing system configured to wash, peel and devein the shrimp, the system comprising a plurality of stations affixed to a housing for processing the shrimp, the system comprising:
    a conveyor system affixed to the housing and comprising a pathway configured to receive a tail portion of the shrimp;
    a motor operably connected to the conveyor system to enable the transport of the shrimp through the pathway;
    a pair of blades mechanically coupled to the housing and secured on opposing sides of the pathway, the pair of blades configured to score the shell proximate the tail portion of the shrimp;
    a cutter mechanically coupled to the housing and configured to slice an upper portion of the shrimp to expose the vein of the shrimp;
    a high-pressure washing station operably connected to the housing and configured to direct water at the shrimp to wash out the vein and loosen the shell; and
    a pair of cylindrical brushes operably connected to the motor and secured to the housing on opposing sides of the pathway, the pair of cylindrical brushes configured to rotate when in contact with the shrimp to enable the removal of the shell from the shrimp.

2. The shrimp processing system of claim 1 further comprising a strainer affixed to the housing, wherein the strainer is configured to receive the shrimp from the pathway.

3. The shrimp processing system of claim 2 further comprising a sump affixed to the housing.

4. The shrimp processing system of claim 3 further comprising a low-pressure washing station operably connected to the housing and configured to wash the vein and shell of the shrimp to the sump.

5. The shrimp processing system of claim 4, wherein the motor is a hydro-powered motor.

6. The shrimp processing system of claim 5 further comprising a water source operably connected to the high-pressure washing station, low-pressure washing station and motor by conduits.

7. The shrimp processing system of claim 6 further comprising a water shut-off valve, pressure control valve and pressure gauge operably connected to the conduits.

8. The shrimp processing system of claim 7 further comprising a water hose and a cleaning gun operably connected to the water source.

9. The shrimp processing system of claim 7 further comprising a transparent cover affixed to the top portion of the housing.

10. The shrimp processing system of claim 7 further comprising a pair of guiderails affixed to the housing on opposing ends of the pathway.

* * * * *